United States Patent
Holm et al.

(10) Patent No.: US 10,260,981 B2
(45) Date of Patent: *Apr. 16, 2019

(54) PRESSURE SENSOR HAVING SENSE ELEMENTS IN MULTIPLE WHEATSTONE BRIDGES WITH CHAINED OUTPUTS

(71) Applicant: NXP USA, INC., Austin, TX (US)

(72) Inventors: Paige M. Holm, Phoenix, AZ (US); Mark Edward Schlarmann, Chandler, AZ (US)

(73) Assignee: NXP USA, Inc., Austin, TX (US)

( * ) Notice: Subject to any disclaimer, the term of this patent is extended or adjusted under 35 U.S.C. 154(b) by 112 days.

This patent is subject to a terminal disclaimer.

(21) Appl. No.: 15/424,994

(22) Filed: Feb. 6, 2017

(65) Prior Publication Data

US 2018/0224348 A1    Aug. 9, 2018

(51) Int. Cl.
  *G01L 19/14*  (2006.01)
  *G01L 9/00*  (2006.01)
  *G01L 9/06*  (2006.01)

(52) U.S. Cl.
  CPC .......... *G01L 19/148* (2013.01); *G01L 9/0052* (2013.01); *G01L 9/0054* (2013.01); *G01L 9/06* (2013.01)

(58) Field of Classification Search
  CPC ... G01L 9/0052; G01L 9/0054; G01L 9/0055; G01L 9/0083; G01L 9/0092; G01L 9/02; G01L 9/04; G01L 9/08
  See application file for complete search history.

(56) References Cited

U.S. PATENT DOCUMENTS 4,065,971 A * 1/1978 Shimazoe ............. G01L 9/0054
                                                                  73/727
4,135,392 A * 1/1979 Young .................. B23Q 1/0054
                                                                  177/211

(Continued)

FOREIGN PATENT DOCUMENTS

EP            0436920 A2    7/1991

OTHER PUBLICATIONS

U.S. Appl. No. 15/382,692, filed Dec. 18, 2016; not yet published; 25 pages.

(Continued)

*Primary Examiner* — Harshad R Patel
*Assistant Examiner* — Tran M. Tran
(74) *Attorney, Agent, or Firm* — Charlene R. Jacobsen

(57) ABSTRACT

A pressure sensor includes a diaphragm suspended across a cavity in a substrate. A first group of piezoresistors is provided in the diaphragm, the piezoresistors of the first group being coupled to one another to form a first Wheatstone bridge having first positive and negative output nodes. A second group of piezoresistors is provided in the diaphragm, the piezoresistors of the second group being coupled to one another to form a second Wheatstone bridge having second positive and negative output nodes. The first negative output node of the first Wheatstone bridge is electrically connected to the second positive output node of the second Wheatstone bridge to directly chain the outputs of the Wheatstone bridges. The first and second Wheatstone bridges each produce an output signal as a function of an external pressure stimulus that is combined via the chained arrangement of the Wheatstone bridges to produce a composite output signal.

20 Claims, 11 Drawing Sheets

(56) References Cited

U.S. PATENT DOCUMENTS

| | | | | |
|---|---|---|---|---|
| 4,528,855 A * | 7/1985 | Singh | G01L 9/0054 | 338/4 |
| 4,695,817 A * | 9/1987 | Kurtz | G01L 9/06 | 338/4 |
| 4,895,026 A * | 1/1990 | Tada | G01L 9/06 | 338/4 |
| 5,107,710 A | 4/1992 | Huck et al. | | |
| 5,551,304 A * | 9/1996 | Baskett | G01L 9/04 | 73/769 |
| 5,784,528 A | 7/1998 | Yamane et al. | | |
| 6,023,978 A * | 2/2000 | Dauenhauer | G01L 9/045 | 338/42 |
| 6,341,528 B1 * | 1/2002 | Hoffman | G01L 9/0055 | 73/777 |
| 6,401,541 B1 * | 6/2002 | Kurtz | G01L 15/00 | 73/716 |
| 6,422,088 B1 * | 7/2002 | Oba | G01D 3/08 | 73/754 |
| 6,518,880 B2 * | 2/2003 | Tanizawa | G01L 9/045 | 340/514 |
| 6,581,468 B2 * | 6/2003 | Clifford | G01L 19/0038 | 73/715 |
| 6,598,484 B2 * | 7/2003 | Tanizawa | G01D 3/036 | 73/754 |
| 6,838,303 B2 * | 1/2005 | Wang | G01L 9/0054 | 438/50 |
| 6,870,236 B2 * | 3/2005 | Johnson | G01L 9/06 | 257/414 |
| 6,904,812 B2 * | 6/2005 | Miyazaki | G01G 19/02 | 73/862.044 |
| 7,061,311 B2 * | 6/2006 | Kilian | G01D 5/145 | 330/146 |
| 7,398,688 B2 * | 7/2008 | Zdeblick | G01L 9/045 | 73/700 |
| 7,633,131 B1 * | 12/2009 | Padmanabhan | B81C 1/00158 | 257/288 |
| 7,694,586 B2 * | 4/2010 | Rey | G01L 5/162 | 73/862.042 |
| 7,893,602 B1 * | 2/2011 | Schiller | F16F 15/005 | 310/313 B |
| 7,934,430 B2 * | 5/2011 | Irving | G01L 1/2262 | 73/795 |
| 8,466,523 B2 * | 6/2013 | Chiou | G01L 9/0052 | 257/417 |
| 8,601,885 B2 * | 12/2013 | Delapierre | G01L 1/148 | 73/862.041 |
| 8,695,433 B2 * | 4/2014 | Shimazu | G01B 7/18 | 73/727 |
| 8,760,039 B2 * | 6/2014 | Schiller | B06B 1/0644 | 310/313 B |
| 8,910,524 B2 * | 12/2014 | Bemis | G01L 13/06 | 73/715 |
| 9,032,818 B2 * | 5/2015 | Campbell | G01L 1/148 | 73/862.628 |
| 9,261,423 B2 * | 2/2016 | Benfield | G01L 5/162 | |
| 9,459,172 B2 * | 10/2016 | Chen | G01L 9/0052 | |
| 9,513,182 B2 * | 12/2016 | Kakoiyama | G01L 9/0052 | |
| 9,689,767 B2 * | 6/2017 | Van Der Wiel | G01L 9/0055 | |
| 9,720,050 B2 * | 8/2017 | Ausserlechner | G01R 33/07 | |
| 9,739,676 B2 * | 8/2017 | Hio | G01L 9/0051 | |
| 9,766,146 B2 * | 9/2017 | Kurtz | G01L 9/0054 | |
| 2004/0079159 A1 * | 4/2004 | Muchow | G01L 9/0055 | 73/716 |
| 2017/0102275 A1 | 4/2017 | Li | | |

OTHER PUBLICATIONS

U.S. Appl. No. 15/480,508, filed Apr. 6, 2017; not yet published; 27 pages).

Kammerer, Jean-Baptiste et al; "Horizontal Hall Effect Sensor With High Maximum Absolute Sensitivity"; IEEE Sensors Journal, vol. 3, No. 6; pp. 700-707 (Dec. 2003).

Rajavelu, Muthapillai et al; "Enhanced sensitivity with extended linearity in MEMS piezoresistive pressure sensor"; Micro & Nano Letters, vol. 8, Iss. 10; pp. 753-756 (2013).

* cited by examiner

| | | NO EXTERNAL PRESSURE | WITH EXTERNAL PRESSURE |
|---|---|---|---|
| $S_{P3}$ | | $IR/2$ | $IR/2-3V_{OUT}/2$ |
| $S_{N3}$ | | $IR/2$ | $IR/2-5V_{OUT}/2$ |
| $V_{P3}$ | | $\sim IR$ | $\sim IR-2V_{OUT}$ |
| $V_{N3}$ | | $\sim 0$ | $-2V_{OUT}$ |
| $S_{P2}$ | | $IR/2$ | $IR/2-V_{OUT}/2$ |
| $S_{N2}$ | | $IR/2$ | $IR/2-3V_{OUT}/2$ |
| $V_{P2}$ | | $\sim IR$ | $\sim IR-V_{OUT}$ |
| $V_{N2}$ | | $\sim 0$ | $-V_{OUT}$ |
| $S_{P1}$ | | $IR/2$ | $IR/2+V_{OUT}/2$ |
| $S_{N1}$ | | $IR/2$ | $IR/2-V_{OUT}/2$ |
| $V_{P1}$ | | $IR$ | $IR$ |
| $V_{N1}$ | | $0$ | $0$ |

PRESSURE SENSOR HAVING SENSE ELEMENTS IN MULTIPLE WHEATSTONE BRIDGES WITH CHAINED OUTPUTS

TECHNICAL FIELD OF THE INVENTION

The present invention relates generally to microelectromechanical systems (MEMS) pressure sensors. More specifically, the present invention relates to a MEMS pressure sensor having a multiple Wheatstone bridge configuration of sense elements in which the Wheatstone bridge outputs are directly chained for enhanced amplitude output.

BACKGROUND OF THE INVENTION

Conventional piezoresistive pressure sensors are formed by a Wheatstone bridge that includes four piezoresistors. These four piezoresistors are placed near the edge of a deformable membrane, i.e., a diaphragm, where the stress change is high under external pressure. Of the four piezoresistors, two are oriented to provide an increase in resistance when external pressure is applied to the diaphragm and two are oriented to provide a decrease in resistance under the same applied external pressure. Accordingly, the output of the Wheatstone bridge is a differential voltage that changes with external applied pressure.

In general, there are two types of pressure sensor designs based on Wheatstone bridges. One type of design places all four piezoresistors of the Wheatstone bridge proximate one edge of the diaphragm. The other type of design places one piezoresistor of the Wheatstone bridge on each of the four edges of the diaphragm. In either configuration, an electronic circuit detects the resistance changes of the piezoresistive bridge and outputs an electrical signal representative of the external applied pressure.

Increasing the sensitivity of a pressure sensor may provide improved resolution and therefore yield improved device performance. Device sensitivity may be increased by increasing the lateral dimensions of the diaphragm. That is, a bigger diaphragm can provide higher deflection under a given applied external pressure and generate more change in stress at the piezoresistor locations. More change in stress at the piezoresistor locations produces a larger electrical output, therefore increased sensitivity. However, a larger diaphragm has the disadvantages of more fragile die/wafer, larger die size/higher cost, and degraded linearity performances.

BRIEF DESCRIPTION OF THE DRAWINGS

The accompanying figures in which like reference numerals refer to identical or functionally similar elements throughout the separate views, the figures are not necessarily drawn to scale, and which together with the detailed description below are incorporated in and form part of the specification, serve to further illustrate various embodiments and to explain various principles and advantages all in accordance with the present invention.

DETAILED DESCRIPTION

In overview, the present disclosure concerns a pressure sensor with enhanced sensitivity. More particularly, the pressure sensor includes a multiple Wheatstone bridge configuration of piezoresistors that are located within differing high stress spots of a pressure sensor diaphragm. The Wheatstone bridges are driven with current sources to allow the bridge potentials to float. Further, the differential voltage outputs of the Wheatstone bridges are combined by directly chaining the outputs together to yield a single composite output having enhanced sensitivity and improved signal-to-noise ratio performance. As such, various inventive concepts and principles embodied in the pressure sensor may improve product quality while enabling cost savings.

The instant disclosure is provided to further explain in an enabling fashion the best modes, at the time of the application, of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It should be understood that the use of relational terms, if any, such as first and second, top and bottom, and the like are used solely to distinguish one from another entity or action without necessarily requiring or implying any actual such relationship or order between such entities or actions.

Figure 1:
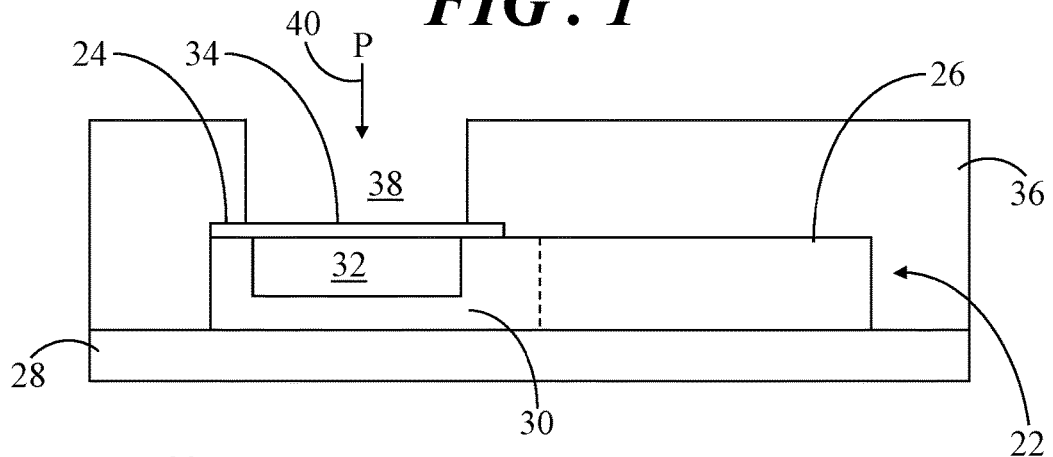
FIG. 1 shows a side view of a pressure sensor in a simplified form.

Referring to FIG. 1, FIG. 1 shows a side view of a pressure sensor 20 in a simplified form. In general, pressure sensor 20 is formed as a single die 22 that includes a microelectromechanical systems (MEMS) pressure sensing portion 24 and an application specific integrated circuit (ASIC) portion 26 in electrical communication with pressure sensing portion 24. Die 22 may, in some configurations, be coupled to a common base 28. For simplicity of illustration pressure sensing portion 24 is delineated from ASIC portion 26 by a dashed line. However, those skilled in the art will recognize that pressure sensing portion 24 and ASIC portion 26 may be integrated in any suitable configuration. Alternatively, some embodiments may entail a pressure sensing element that is fabricated and packaged separately from the associated ASIC die.

Pressure sensing portion 24 generally includes a substrate 30 having a cavity 32. A deformable membrane, referred to herein as a diaphragm 34, is suspended across cavity 32. In some embodiments, die 22 may be encapsulated in a molding compound 36. A port 38 may thus extend through molding compound 36 so as to expose diaphragm 34 of pressure sensing portion 24 to an external applied pressure, P, 40. Under external applied pressure 40, diaphragm 34 deforms. Die 22 thus detects the resistance changes of piezoresistors (discussed below) provided in diaphragm 34 and outputs an electrical signal representative of external applied pressure 40. Although an overmolded die configuration is shown, it should be understood that other configurations may entail a cavity package, a chip scale package, or any other suitable package.

Figure 2:
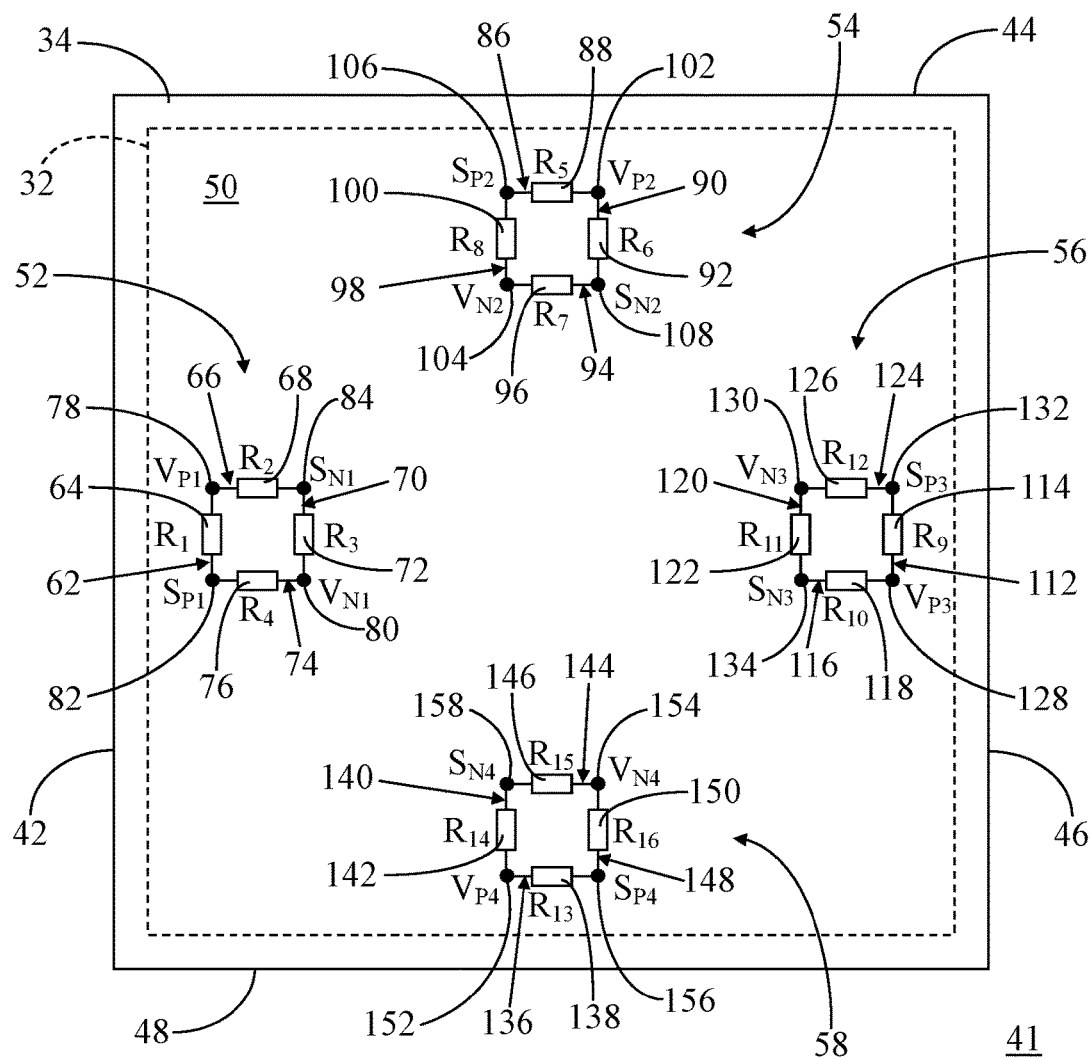
FIG. 2 shows a top view of a pressure sensing element of the pressure sensor of FIG. 1 in accordance with an embodiment.

FIG. 2 shows a top view of a pressure sensing element 41 that may be incorporated in pressure sensor 20 in accordance with an embodiment. In particular, diaphragm 34 is shown with a plurality of sense elements, e.g., piezoresistors, provided therein. Diaphragm 34 has first, second, third, and fourth outer edges 42, 44, 46, and 48. In an example, first and third outer edges 42, 46 are disposed on opposing sides of a surface 50 of diaphragm 34. Similarly, second and fourth outer edges 44, 48 are disposed on opposing sides of surface 50 of diaphragm 34 and are interposed between first and third outer edges 42, 46. Thus, surface 50 is circumscribed by first, second, third, and fourth outer edges 42, 44, 46, 48. A dashed line box represents the outer perimeter of cavity 32 underlying diaphragm 34. Although a rectangular diaphragm 34 is shown, diaphragm 34 may be round, oval, or any other suitable shape in other embodiments.

The stress levels are higher near the edges of the region above cavity 32. In the illustrated configuration, the edges of the region above cavity 32 are approximately along the perimeter of diaphragm 34, i.e. near first, second, third, and fourth outer edges 42, 44, 46, 48 relative to other regions of diaphragm 34. Thus, in an embodiment, pressure sensing element 41 includes multiple Wheatstone bridge circuits. Each of the Wheatstone bridges includes four piezoresistors, with the four piezoresistors being placed together in a localized manner near one outer edge of diaphragm 34. In this example, a first group of piezoresistors is provided in diaphragm 34 proximate first outer edge 42 of diaphragm 34. The piezoresistors of the first group are coupled to one another to form a first Wheatstone bridge 52. A second group of piezoresistors is provided in diaphragm 34 proximate second outer edge 44 of diaphragm 34. The piezoresistors of the second group are coupled to one another to form a second Wheatstone bridge 54. Similarly, a third group of piezoresistors is provided in diaphragm 34 proximate third outer edge 46 of diaphragm 34. The piezoresistors of the third group are coupled to one another to form a third Wheatstone bridge 56. A fourth group of piezoresistors is provided in diaphragm 34 proximate fourth outer edge 48 of diaphragm 34. The piezoresistors of the fourth group are coupled to one another to form a fourth Wheatstone bridge 58.

Each of first, second, third, and fourth Wheatstone bridges 52, 54, 56, 58 is approximately equidistant from its respective, first, second, third, and fourth outer edges 42, 44, 46, 48. In an ideal configuration, diaphragm 34 would be centered over cavity 32 (as shown in FIG. 2) so that each of first, second, third, and fourth Wheatstone bridges 52, 54, 56, 58 is subject to approximately the same stress level on surface 50 of diaphragm 34 as a function of the distance from a center of cavity 32 in response to external applied pressure 40 (FIG. 1).

With particular reference to the structure and arrangement of the Wheatstone bridges, first Wheatstone bridge 52 includes a first leg 62 having a first piezoresistor 64, labeled $R_1$, a second leg 66 having a second piezoresistor 68, labeled $R_2$, a third leg 70 having a third piezoresistor 72, labeled $R_3$, and a fourth leg 74 having a fourth piezoresistor 76, labeled $R_4$. First and fourth piezoresistors 64, 76 are coupled in series to form a first half of first Wheatstone bridge 52. Second and third piezoresistors 68, 72 are coupled in series to form a second half of first Wheatstone bridge 52. The first half of first Wheatstone bridge 52 is coupled in parallel with the second half of first Wheatstone bridge 52 such that a first node between first and second piezoresistors 64, 68 forms a first positive input node 78, labeled $V_{P1}$, and a second node between third and fourth piezoresistors 72, 76 forms a first negative input node 80, labeled $V_{N1}$. In accordance with the Wheatstone bridge configuration, a third node between first and fourth piezoresistors 64, 76 forms a first positive output node 82, labeled $S_{P1}$, and a fourth node between second and third piezoresistors 68, 72 forms a first negative output node 84, labeled $S_{N1}$. The nomenclature "first" with respect to the specific nodes and the subscript "1" is used herein to correlate with first Wheatstone bridge 52. It can be readily observed that first and third legs 62, 70 are oriented substantially parallel to first outer edge 42 of diaphragm 34. Additionally, second and fourth legs 66, 74 are oriented substantially normal, i.e., perpendicular, to first outer edge 42 of diaphragm 34.

Now with reference to second Wheatstone bridge 54, second Wheatstone bridge 54 includes a first leg 86 having a first piezoresistor 88, labeled $R_5$, a second leg 90 having a second piezoresistor 92, labeled $R_6$, a third leg 94 having a third piezoresistor 96, labeled $R_7$, and a fourth leg 98 having a fourth piezoresistor 100, labeled $R_8$. First and fourth piezoresistors 88, 100 are coupled in series to form a first half of second Wheatstone bridge 54. Second and third piezoresistors 92, 96 are coupled in series to form a second half of second Wheatstone bridge 54. The first half of second Wheatstone bridge 54 is coupled in parallel with the second half of second Wheatstone bridge 54 such that a first node between first and second piezoresistors 88, 92 forms a second positive input node 102, labeled $V_{P2}$, and a second node between third and fourth piezoresistors 96, 100 forms a second negative input node 104, labeled $V_{N2}$. In accordance with the Wheatstone bridge configuration, a third node between first and fourth piezoresistors 88, 100 forms a second positive output node 106, labeled $S_{P2}$, and a fourth node between second and third piezoresistors 92, 96 forms a second negative output node 108, labeled $S_{N2}$. The nomenclature "second" with respect to the specific nodes and the subscript "2" is used herein to correlate with second Wheatstone bridge 54. First and third legs 86, 94 are oriented substantially parallel to second outer edge 44 of diaphragm 34. Additionally, second and fourth legs 90, 98 are oriented substantially normal, i.e., perpendicular, to second outer edge 44 of diaphragm 34.

Referring now to third Wheatstone bridge 56, third Wheatstone bridge 56 includes a first leg 112 having a first piezoresistor 114, labeled $R_9$, a second leg 116 having a second piezoresistor 118, labeled $R_{10}$, a third leg 120 having a third piezoresistor 122, labeled $R_{11}$, and a fourth leg 124 having a fourth piezoresistor 126, labeled $R_{12}$. First and fourth piezoresistors 114, 126 are coupled in series to form a first half of third Wheatstone bridge 56. Second and third piezoresistors 118, 122 are coupled in series to form a second half of third Wheatstone bridge 56. The first half of third Wheatstone bridge 56 is coupled in parallel with the second half of third Wheatstone bridge 56 such that a first node between first and second piezoresistors 114, 118 forms a third positive input node 128, labeled $V_{P3}$, and a second node between third and fourth piezoresistors 122, 126 forms a third negative input node 130, labeled $V_{N3}$. In accordance with the Wheatstone bridge configuration, a third node between first and fourth piezoresistors 114, 126 forms a third positive output node 132, labeled $S_{P3}$, and a fourth node between second and third piezoresistors 118,122 forms a third negative output node 134, labeled $S_{N3}$. The nomenclature "third" with respect to the specific nodes and the subscript "3" is used herein to correlate with third Wheatstone bridge 56. It can be readily observed that first and third legs 112, 120 are oriented substantially parallel to third outer edge 46 of diaphragm 34. Additionally, second and fourth legs 116, 124 are oriented substantially normal, i.e., perpendicular, to third outer edge 46 of diaphragm 34.

Fourth Wheatstone bridge 58 includes a first leg 136 having a first piezoresistor 138, labeled $R_{13}$, a second leg 140 having a second piezoresistor 142, labeled $R_{16}$, a third leg 144 having a third piezoresistor 146, labeled $R_{15}$, and a fourth leg 148 having a fourth piezoresistor 150, labeled $R_{16}$. First and fourth piezoresistors 138, 150 are coupled in series to form a first half of fourth Wheatstone bridge 58. Second and third piezoresistors 142, 146 are coupled in series to form a second half of fourth Wheatstone bridge 58. The first half of fourth Wheatstone bridge 58 is coupled in parallel with the second half of fourth Wheatstone bridge 58 such that a first node between first and second piezoresistors 138, 142 forms a fourth positive input node 152, labeled $V_{P4}$, and a second node between third and fourth piezoresistors 146, 150 forms a fourth negative input node 154, labeled $V_{N4}$. In accordance with the Wheatstone bridge configuration, a third node between first and fourth piezoresistors 138, 150 forms a fourth positive output node 156, labeled $S_{P4}$, and a fourth node between second and third piezoresistors 142, 146 forms a fourth negative output node 158, labeled $S_{N4}$. The nomenclature "fourth" with respect to the specific nodes and the subscript "4" is used herein to correlate with fourth Wheatstone bridge 58. Again, it can be readily observed that first and third legs 136, 144 are oriented substantially parallel to fourth outer edge 48 of diaphragm 34. Additionally, second and fourth legs 140, 148 are oriented substantially normal, i.e., perpendicular, to fourth outer edge 48 of diaphragm 34.

Figure 3:
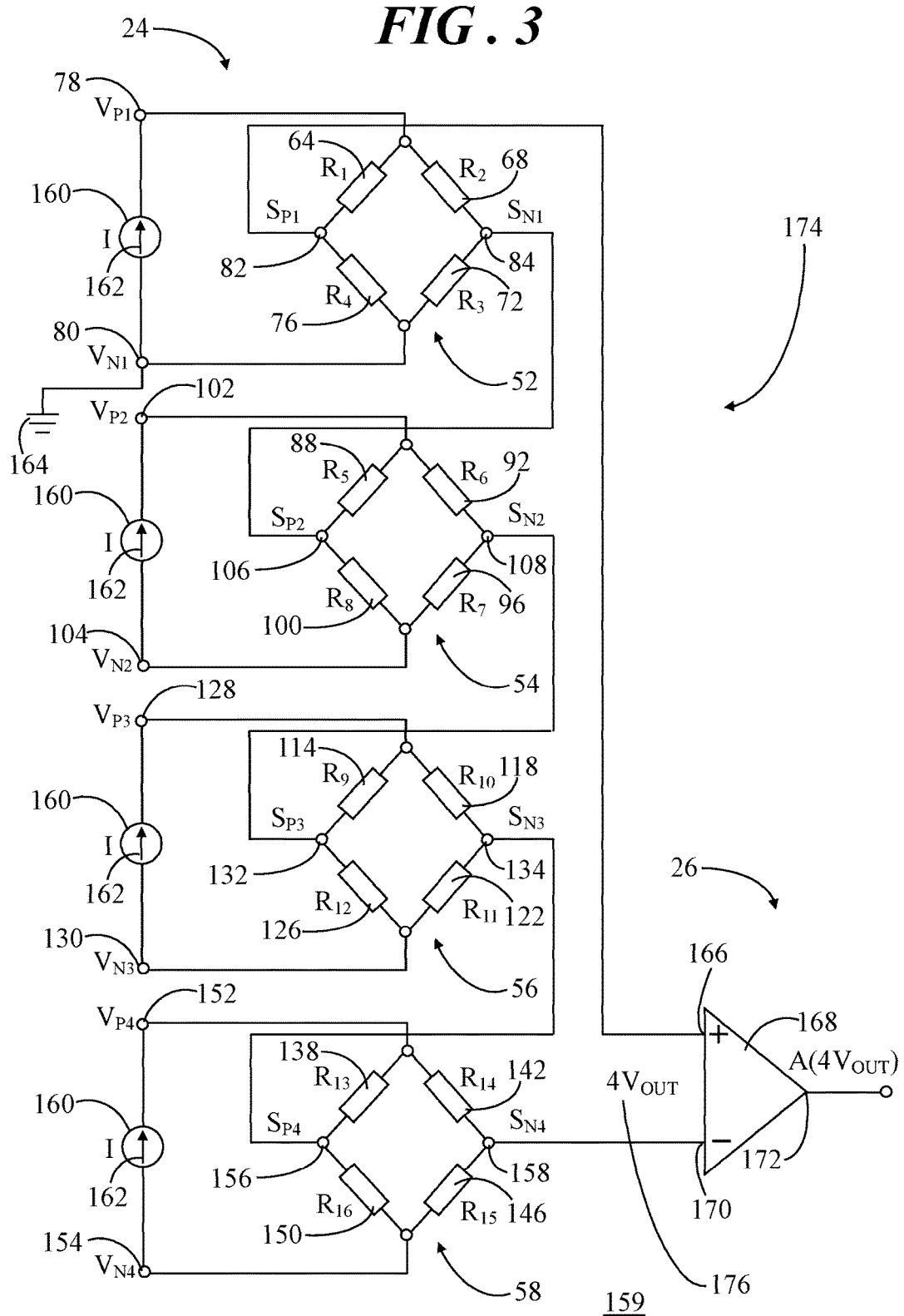
FIG. 3 shows a circuit diagram corresponding to the pressure sensing element of FIG. 2.

Referring to FIG. 3 concurrently with FIG. 2, FIG. 3 shows a circuit diagram 159 corresponding to the multiple Wheatstone bridge configuration of pressure sensing element 41. In particular, FIG. 3 shows first, second, third, and fourth Wheatstone bridges 52, 54, 56, 58 of pressure sensing element 41 and their interconnection to form a chained arrangement 174 of Wheatstone bridges in accordance with an embodiment.

A pressure sensor, e.g., pressure sensor 20 (FIG. 1), having first, second, third, and fourth Wheatstone bridges 52, 54, 56, 58 of pressure sensing element 41 includes a current source 160 interconnected between respective positive and negative input nodes of each of first, second, third, and fourth Wheatstone bridges 52, 54, 56, 58. It should be understood, that each of first, second, third, and fourth Wheatstone bridges 52, 54, 56, 58 has a distinct current source 160 interconnected between its associated positive and negative input nodes. That is, current source 160 is interconnected between first positive and negative input nodes 78, 80 of first Wheatstone bridge 52. Similarly, current source 160 is interconnected between second positive and negative input nodes 102, 104 of second Wheatstone bridge 54. Current source 160 is interconnected between third positive and negative input nodes 128, 130 of third Wheatstone bridge 56. And, current source 160 is interconnected between fourth positive and negative input nodes 152, 154 of fourth Wheatstone bridge 58. Thus, current source 160 is configured to deliver a supply current, denoted by an arrow 162, to each of first, second, third, and fourth Wheatstone bridges 52, 54, 56, 58. However, in the illustrated configuration, first negative input node 80 is electrically coupled to a system ground 164, whereas the remaining second, third, and fourth negative nodes 104, 130, 154 are not coupled to system ground 164.

Now with reference to the Wheatstone bridge outputs, first positive output node 82 of first Wheatstone bridge 52 is electrically connected to a positive terminal 166 of a differential amplifier 168 within, for example, ASIC portion 26 (FIG. 1) of pressure sensor 20 (FIG. 1). However, first negative output node 84 of first Wheatstone bridge 52 is electrically connected to second positive output node 106 of second Wheatstone bridge 54. Similarly, second negative output node 108 of second Wheatstone bridge 54 is electrically connected to third positive output node 132 of third Wheatstone bridge 56. Third negative output node 134 of third Wheatstone bridge 56 is electrically connected to fourth positive output node 156 of fourth Wheatstone bridge 58. And, fourth negative output node 158 of fourth Wheatstone bridge is electrically connected to a negative terminal 170 of differential amplifier 168. Differential amplifier 168 further includes an output terminal 172 configured to provide a conditioned composite output signal, $A(NV_{OUT})$, as a function of external pressure stimulus 40 (FIG. 1) detected by each of first, second, third, and fourth Wheatstone bridges 52, 54, 56, 58, where "A" denotes the gain imposed by differential amplifier 168.

Accordingly, circuit diagram 159 illustrates a directly chained (i.e., linked, stacked, or cascaded) arrangement 174 of Wheatstone bridges. More particularly, chained arrangement 174 is produced via an interconnection of a negative output node of a preceding Wheatstone bridge with a positive output node of a successive Wheatstone bridge. This direct chaining can be accomplished within pressure sensor portion 24 of pressure sensor 20 (FIG. 1), by forming the interconnects between bridges either on or immediately surrounding diaphragm 34.

To allow the Wheatstone bridge outputs to be chained together (e.g., chained arrangement 174), Wheatstone bridges 52, 54, 56, 58 are driven with current source 160 in lieu of a traditional voltage source. This allows all but one of Wheatstone bridges 52, 54, 56, 58 in chained arrangement 174 to float to voltage potentials set by the chained voltages of their outputs (as will be discussed in greater detail below). With each Wheatstone bridge 52, 54, 56, 58 driven by supply current 162, I, equivalent to the current of a maximally-biased, standard bridge configuration ($V_P/R=V_S/R$), a chained output signal is a composite, or combination, of each of Wheatstone bridges 52, 54, 56, 58. The chained output signal, referred to herein as composite output signal 176, labeled $NV_{OUT}$, will be approximately "N" times that of a single Wheatstone bridge, where "N" represents the number of Wheatstone bridges, as will be discussed in greater detail in connection with FIGS. 4 and 5. In addition, the noise will only be the square root of N as large so that the signal-to-noise ratio will also improve (discussed below). Still further, the offset distribution may be narrowed by the square root of N as the offsets of the Wheatstone bridges will add algebraically so that the random components of the offsets will see some cancellation effect.

Figures 4, 5:
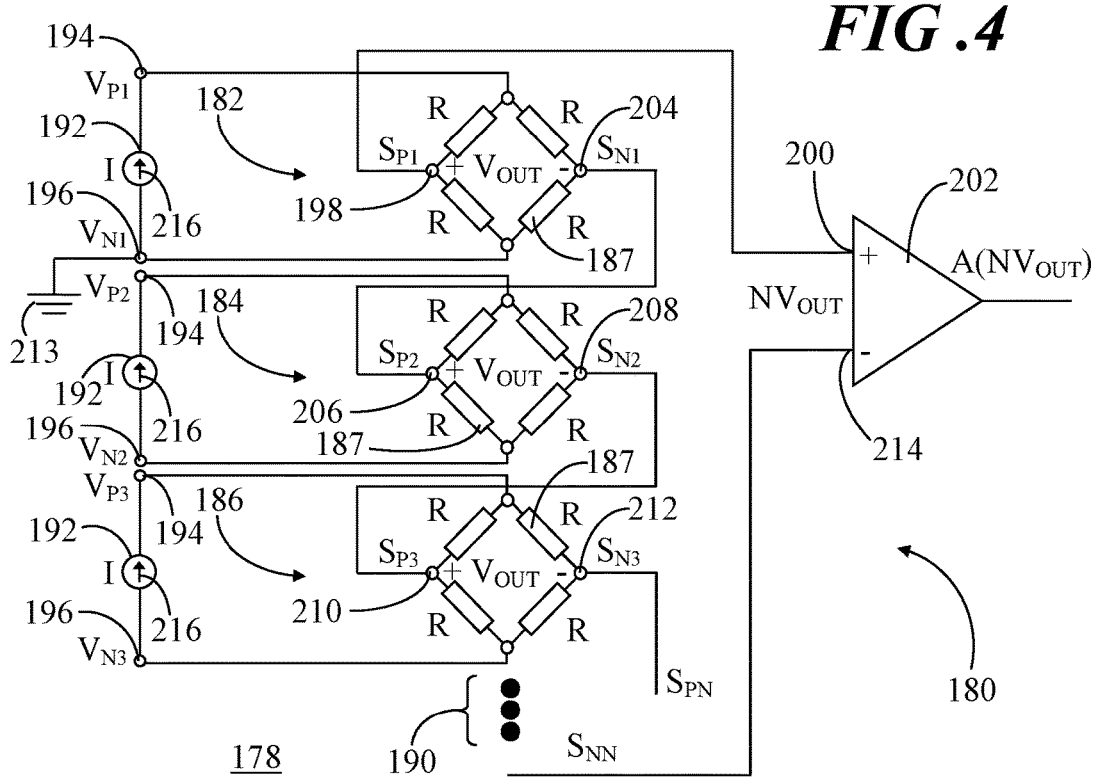
FIG. 4 shows a generalized circuit diagram demonstrating a chained arrangement of Wheatstone bridges of the multiple embodiments of the pressure sensor of FIG. 1.
FIG. 5 shows a table associated with the circuit diagram of FIG. 4 demonstrating sensitivity enhancement of a pressure sensor having the chained arrangement of multiple Wheatstone bridges.

Referring now to FIGS. 4 and 5, FIG. 4 shows a generalized circuit diagram 178 demonstrating a chained arrangement 180 of Wheatstone bridges 182, 184, 186 of sense elements 187 (e.g., piezoresistors) of the multiple embodiments of pressure sensor 20 (FIG. 1), and FIG. 5 shows a table 188 associated with circuit diagram 178 demonstrating sensitivity enhancement of a pressure sensor having chained arrangement 180 of multiple Wheatstone bridges 182, 184, 186. Ellipses 190 provided in circuit diagram 178 indicate that chained arrangement 180 can have any suitable number "N" of Wheatstone bridges in accordance with an implementation of a pressure sensing element of a pressure sensor.

Each of Wheatstone bridges is driven by a current source 192 interconnected between positive input nodes 194 and negative input nodes 196 of each of Wheatstone bridges 182, 184, 186. Additionally, a positive output node 198 of a "first" Wheatstone bridge 182 is electrically connected to a positive terminal 200 of a differential amplifier 202. A negative output node 204 of Wheatstone bridge 182 is electrically connected to a positive output node 206 of the "second" Wheatstone bridge 184 in chained arrangement 180. A negative output node 208 of Wheatstone bridge 184 is electrically connected to a positive output node 210 of the "third" Wheatstone bridge 186 in chained arrangement. A negative output node 212 of Wheatstone bridge 186 is electrically connected to a positive output node, labeled $S_{PN}$, of the next Wheatstone bridge, and so forth. Thus, the negative output node, labeled $S_{NN}$, of the last Wheatstone bridge of chained arrangement is electrically coupled to a negative terminal 214 of differential amplifier 202.

Only one of Wheatstone bridges (i.e., Wheatstone bridge 182 in this example) is electrically connected to a system ground 213, while the remaining Wheatstone bridges 184, 186 are not. As such, the voltage potentials of each of Wheatstone bridges 184, 186 are allowed to float and their differential voltage outputs, $NV_{OUT}$, can be combined by directly chaining the Wheatstone bridges together in chained arrangement 180, as described above.

In an embodiment, the resistance, R, of each of sense elements 187 of Wheatstone bridges 182, 184, 186 is the same without application of external pressure 40 (FIG. 1). When currents 216 are injected into the input nodes of the Wheatstone bridges, voltages appear at the output nodes of the Wheatstone bridges. The voltages change in response to changes in the values, R, of sense elements 187. Since sense elements 187 are formed in diaphragm 34 (FIG. 1) of the pressure sensing element, the nominal resistance of each of sense elements 187 will change when diaphragm 34 deflects in response to external pressure 40 (FIG. 1).

Accordingly, and with particular reference to table 188 of FIG. 5, when supply current 216 is applied between positive and negative input nodes 194, 196 of Wheatstone bridge 182, the voltage at positive input node 194, $V_{P1}$, is IR (current times resistance, where R represents the impedance of the bridge) while the voltage at negative input node 196, $V_{N1}$ is zero since negative input node 196 is tied to system ground 213 (whether or not external pressure is applied). Without application of external pressure 40, none of Wheatstone bridges 182, 184, 186 float to higher potentials and the voltages of similar nodes in each of Wheatstone bridges 184, 186 mirrors Wheatstone bridge 182. Thus, positive output node 194 ($V_{P2}$, $V_{P3}$) of each of Wheatstone bridges 184, 186 is approximately IR and negative output node 196 ($V_{N2}$, $V_{N3}$) of each of Wheatstone bridges 184, 186 is approximately zero. Further, voltages at each of positive output nodes 198, 206, 210 and at each of negative output nodes 204, 208, 212 sit at IR/2.

However, with application of external pressure 40, positive output node 198 (electrically connected to positive terminal 200 of differential amplifier 202) has a voltage potential of IR/2+$V_{OUT}$/2 and negative output node 208 has a voltage potential of IR/2−$V_{OUT}$/2. Due to chained arrangement 180, the voltage at positive output node 206 ($S_{P2}$) of the successive Wheatstone bridge 184 is equal to negative output node 204 ($S_{N1}$) of the preceding Wheatstone bridge 182. Similarly, the voltage at positive output node 210 of the successive Wheatstone bridge 186 ($S_{P3}$) is equal to negative output node 208 ($S_{N2}$) of the preceding Wheatstone bridge 184. This analysis can be carried further with the successive Wheatstone bridge following Wheatstone bridge 186 in chained arrangement 180. By implementing current sources 192, the potentials of each of Wheatstone bridges are allowed to float. As such, their differential voltage outputs are combined by directly chaining the signals together in chained arrangement 180. Effectively, the net result is that the voltage output of chained arrangement 180 of the Wheatstone bridges is a composite output signal of $NV_{OUT}$ where N is the quantity of Wheatstone bridges in chained arrangement 180. In other words, the voltage output, $V_{OUT}$, of each Wheatstone bridge is effectively summed together.

Summation of the voltage output of each Wheatstone bridge yields higher sensitivity to the application of external pressure 40 than that of a single Wheatstone bridge. Further, signal-to-noise benefits can be achieved. For example, when combining two nominally equal noisy voltage signals, the resultant output voltage is the sum of the two signals. However, the resulting noise level in the output is only $\sqrt{2}$ of the noise in each signal. Extending this principle to the combination of "N" of the same but independent voltage signals, the output signal level is increased by a factor of "N" while the noise increases by only $\sqrt{N}$. This yields a net improvement in the signal-to-noise ratio (SNR) by a factor of $N/\sqrt{N}=\sqrt{N}$, albeit at an increased power level. This principle applies only if the signals are totally uncorrelated. The signals coming from multiple Wheatstone bridges placed on the same diaphragm are generally uncorrelated. Therefore, the SNR is approximately $\sqrt{N}$ greater than a conventional single Wheatstone bridge design. Accordingly, by combining outputs of multiple Wheatstone bridges, the SNR will scale with $\sqrt{N}$. Additionally, the offset distribution may be narrowed by $\sqrt{N}$ as the offset error of each of the Wheatstone bridges will add algebraically so that the random components of the offset error will see some cancellation effects. Further, for a fixed SNR, a reduction in sensor power consumption may be realized by summing the independent voltages across multiple resistive segments (e.g., multiple Wheatstone bridge outputs) when each are driven independently at proportionally reduced current levels.

FIGS. 6-13 provide alternative configurations of sense elements provided in diaphragm 34 of a pressure sensing element. Each of the alternative configurations includes multiple Wheatstone bridges suitably positioned in high stress regions of diaphragm 34 relative to the remainder of diaphragm 34. However, each of the alternative configurations entails the chained configuration of multiple Wheatstone bridges in order to realize the benefits of increased sensitivity, improved SNR performance, reduced offset error, and so forth.

Figure 6:
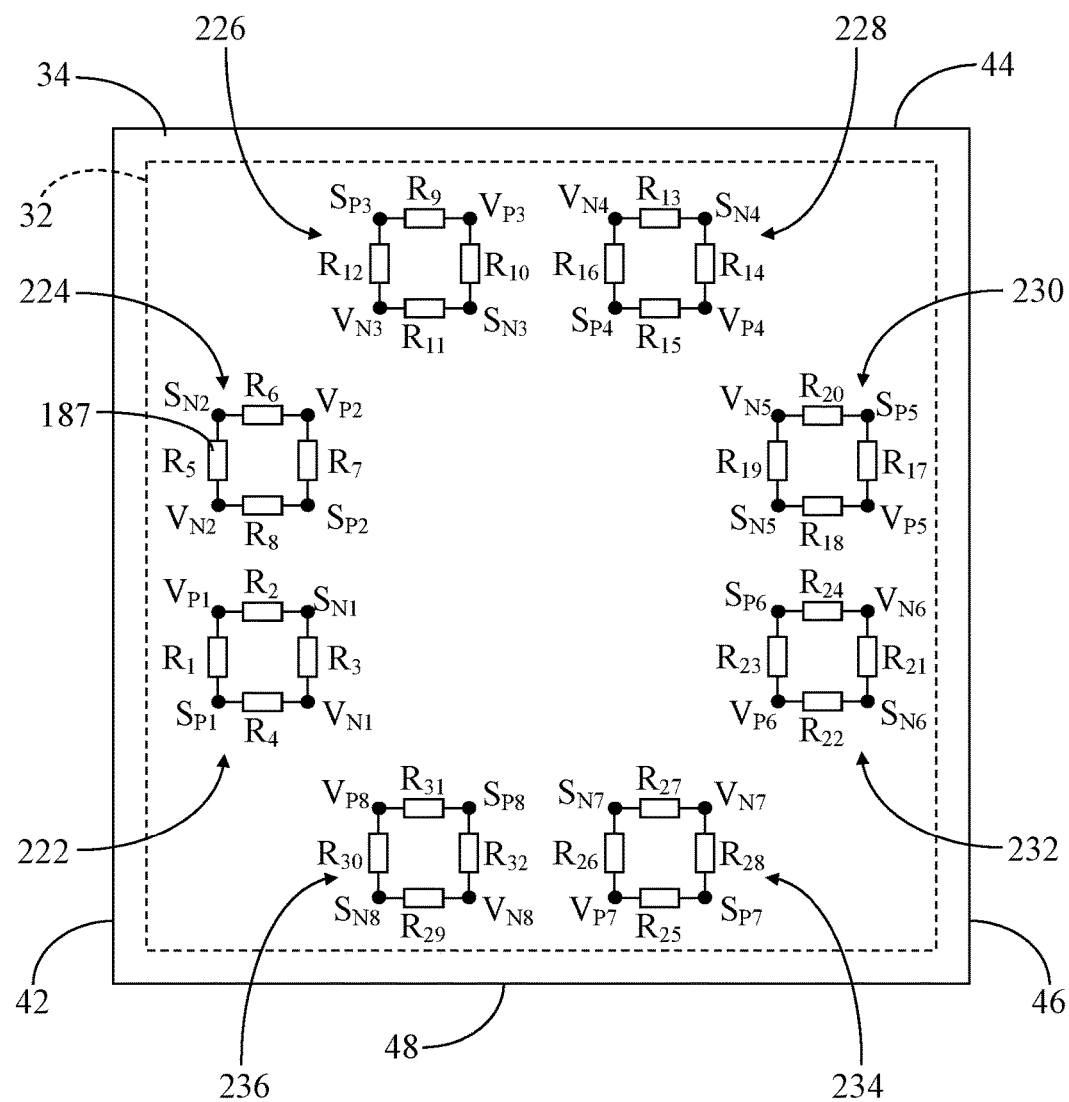
FIG. 6 shows a top view of a pressure sensing element for a pressure sensor in accordance with another embodiment.
Figure 7:
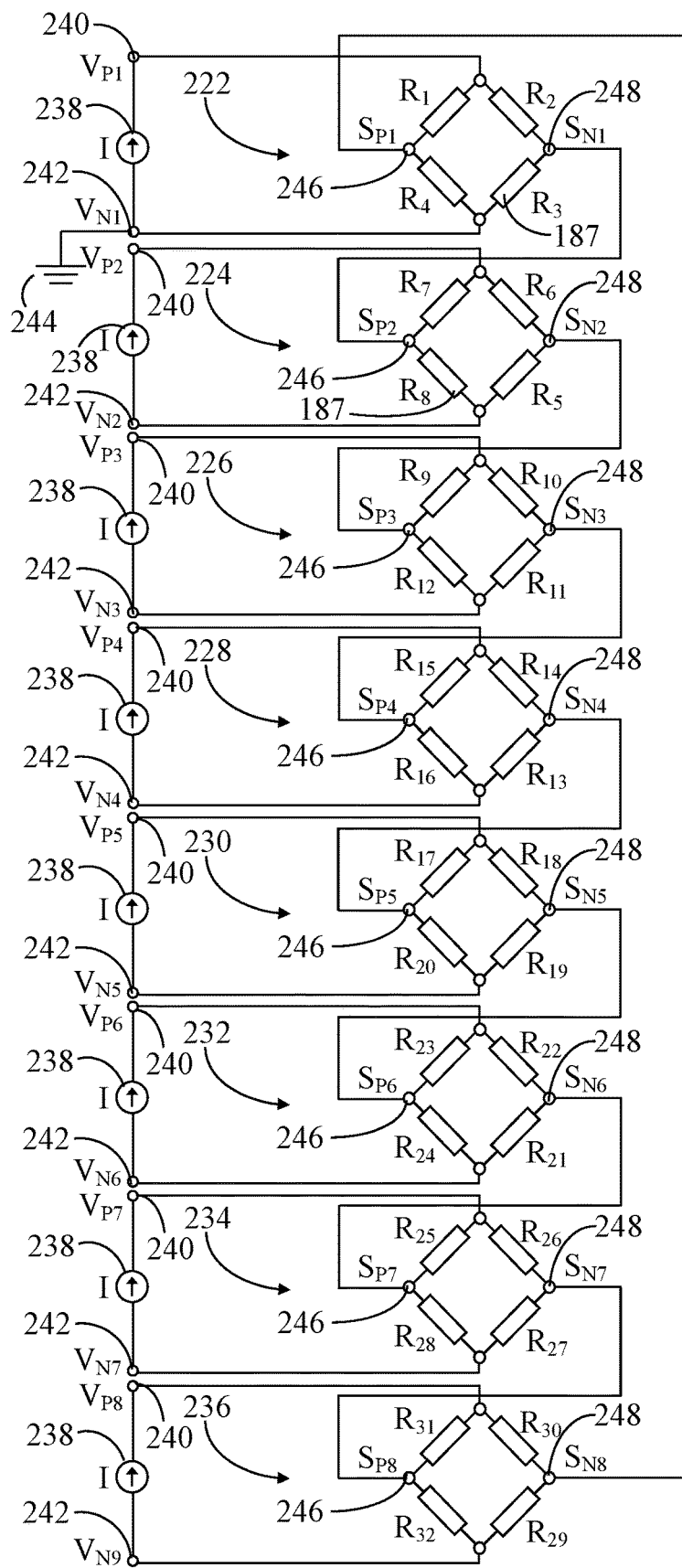
FIG. 7 shows a circuit diagram corresponding to the multiple Wheatstone bridge configuration of the pressure sensing element of FIG. 6.
Figure 7:
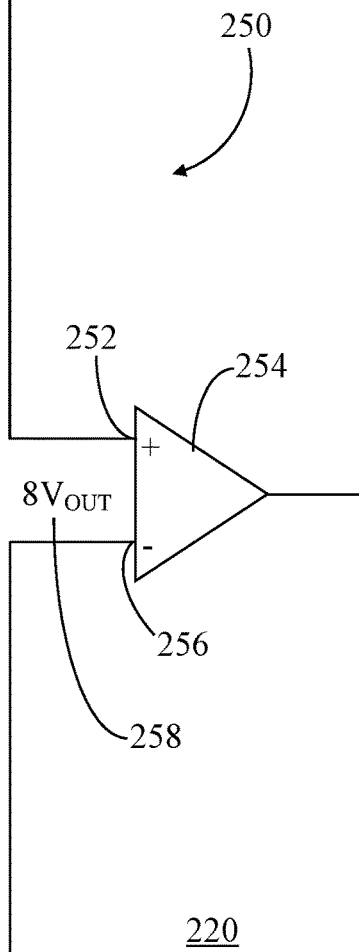

Referring to FIGS. 6 and 7, FIG. 6 shows a top view of a pressure sensing element 218 for a pressure sensor (e.g., pressure sensor 20 of FIG. 1) in accordance with another embodiment and FIG. 7 shows a circuit diagram 220 corresponding to a multiple Wheatstone bridge configuration of pressure sensing element 218. The small size of localized Wheatstone bridges of sense elements 187 (e.g., piezoresistors) can enable the placement of multiple Wheatstone bridges located along the perimeter of diaphragm 34, i.e. near first, second, third, and fourth outer edges 42, 44, 46, 48.

In this illustration, two Wheatstone bridges 222 (having sense elements 187 of $R_1$, $R_2$, $R_3$, $R_4$) and 224 (having sense elements 187 of $R_5$, $R_6$, $R_7$, $R_8$) are located proximate first outer edge 42 of diaphragm 34. Two Wheatstone bridges 226 (having sense elements 187 of $R_9$, $R_{10}$, $R_{11}$, $R_{12}$) and 228 (having sense elements 187 of $R_{13}$, $R_{14}$, $R_{15}$, $R_{16}$) are located proximate second outer edge 44 of diaphragm 34. Two Wheatstone bridges 230 (having sense elements 187 of $R_{17}$, $R_{18}$, $R_{19}$, $R_{20}$) and 232 (having sense elements 187 of $R_{21}$, $R_{22}$, $R_{23}$, $R_{24}$) are located proximate third outer edge 46 of diaphragm 34. And, two Wheatstone bridges 234 (having sense elements 187 of $R_{25}$, $R_{26}$, $R_{27}$, $R_{28}$) and 236 (having sense elements 187 of $R_{29}$, $R_{30}$, $R_{31}$, $R_{32}$) are located proximate fourth outer edge 48 of diaphragm 34.

With particular reference to FIG. 7, each of Wheatstone bridges 222, 224, 226, 228, 230, 232, 234, 236 is driven by a current source 238 interconnected between positive input nodes 240 and negative input nodes 242 of each of Wheatstone bridges 222, 224, 226, 228, 230, 232, 234, 236. Additionally, only one of Wheatstone bridges (i.e., Wheatstone bridge 222) is electrically connected to a system ground 244, while the remaining Wheatstone bridges 224, 226, 228, 230, 232, 234, 236 are not.

Each of Wheatstone bridges 222, 224, 226, 228, 230, 232, 234, 236 of pressure sensing element 218 includes a positive output node 246 and a negative output node 248. Further, like the previously described configuration, Wheatstone bridges 222, 224, 226, 228, 230, 232, 234, 236 are suitably connected to form a chained arrangement 250 of Wheatstone bridges 222, 224, 226, 228, 230, 232, 234, 236. As such, positive output node 246 of a "first" Wheatstone bridge 222 is electrically connected to a positive terminal 252 of a differential amplifier 254. Negative output node 248 of the preceding Wheatstone bridge 222 is electrically connected to positive output node 246 of the successive, i.e., next, Wheatstone bridge 224 in chained arrangement 250. Negative output node 248 of the preceding Wheatstone bridge 224 is electrically connected to a positive output node 246 of the next Wheatstone bridge 226 in chained arrangement 250, and so forth. Thus, negative output node 248 of the last Wheatstone bridge 236 of chained arrangement 250 is electrically coupled to a negative terminal 256 of differential amplifier 254. Accordingly, the differential outputs of Wheatstone bridges 222, 224, 226, 228, 230, 232, 234, 236 are combined by directly chaining the Wheatstone bridges to produce a composite output signal 258 that is approximately eight times that of a single one of Wheatstone bridges 222, 224, 226, 228, 230, 232, 234, 236 with enhanced signal to noise performance.

Figure 8:
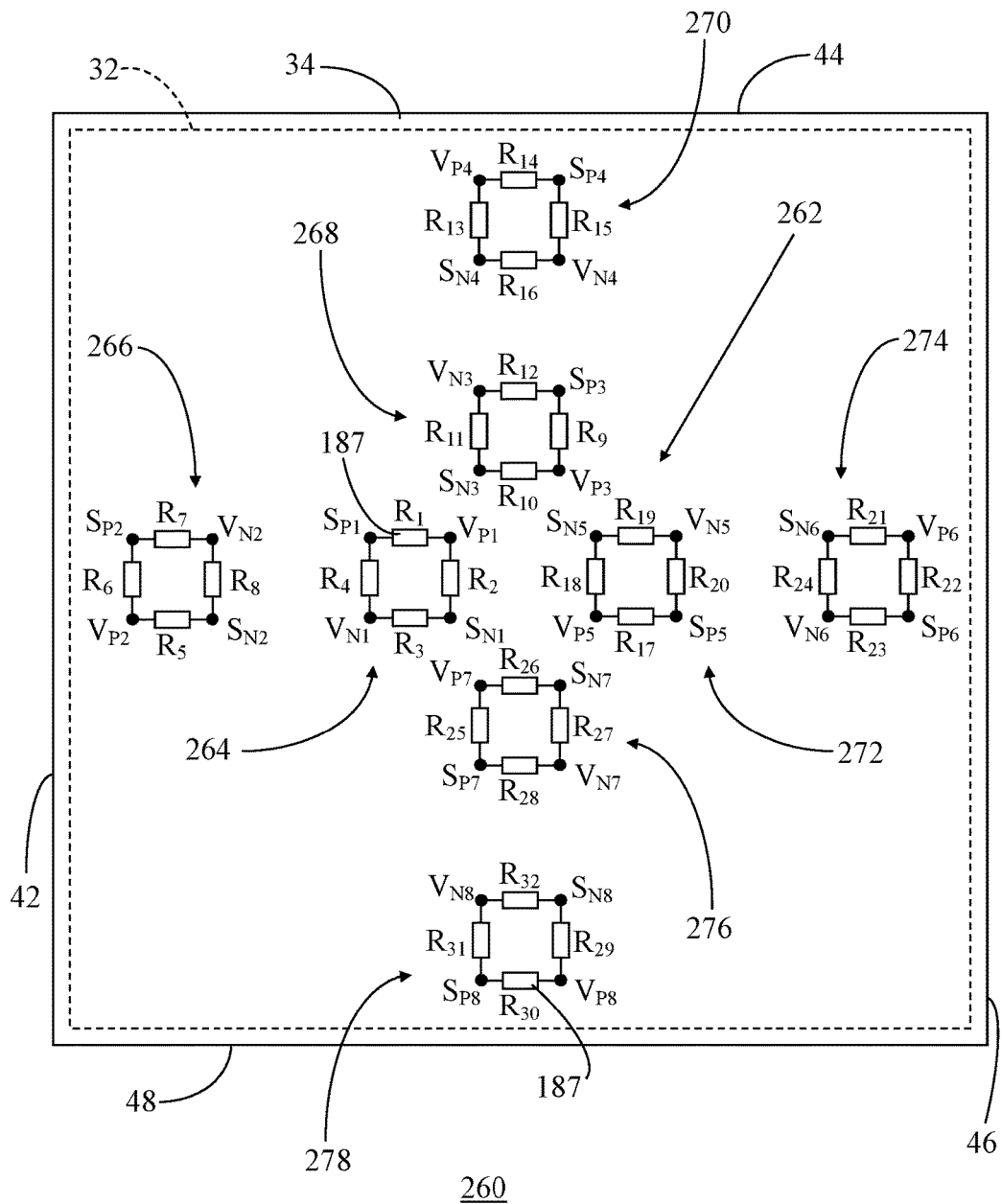
FIG. 8 shows a top view of a pressure sensing element for a pressure sensor in accordance with another embodiment.
Figure 9:
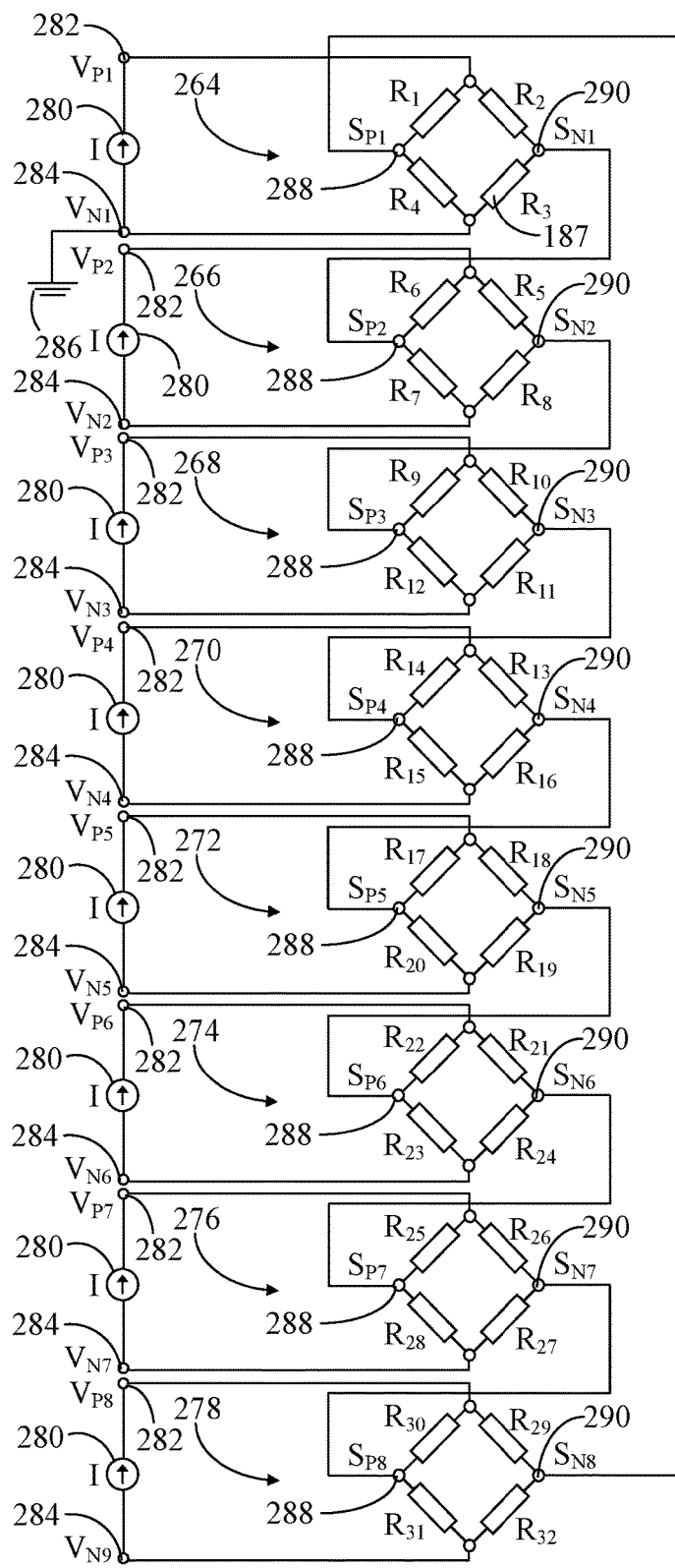
FIG. 9 shows a circuit diagram corresponding to the multiple Wheatstone bridge configuration of the pressure sensing element of FIG. 8.

Referring now to FIGS. 8 and 9, FIG. 8 shows a top view of a pressure sensing element 260 for a pressure sensor (e.g., pressure sensor 20 of FIG. 1) in accordance with another embodiment, and FIG. 9 shows a circuit diagram 261 corresponding to the multiple Wheatstone bridge configuration of pressure sensing element 260.

Diaphragm 34 is circumscribed by first, second, third, and fourth outer edges 42, 44, 46, 48 and includes a central region 262. Along with the perimeter of diaphragm 34, central region 262 (excluding the midpoint of central region 262) along the principle axes may also be a high stress region of diaphragm 34. In principle, Wheatstone bridges of sense elements 187 may be provided at any location on diaphragm 34 where stress exists. Thus, FIGS. 8 and 9 provide an example in which four Wheatstone bridges are located at central region 262 and four Wheatstone bridges are located at the perimeter of diaphragm 34.

In this illustration, a first Wheatstone bridge 264 (having sense elements 187 of $R_1$, $R_2$, $R_3$, $R_4$) is located at central region 262 and a corresponding second Wheatstone bridge 266 (having sense elements 187 of $R_5$, $R_6$, $R_7$, $R_8$) is located proximate first outer edge 42 of diaphragm 34. Similarly, a third Wheatstone bridge 268 (having sense elements 187 of $R_9$, $R_{10}$, $R_{11}$, $R_{12}$) is located at central region 262 and a fourth Wheatstone bridge 270 (having sense elements 187 of $R_{13}$, $R_{14}$, $R_{15}$, $R_{16}$) is located proximate second outer edge 44 of diaphragm 34. A fifth Wheatstone bridge 272 (having sense elements 187 of $R_{17}$, $R_{18}$, $R_{19}$, $R_{20}$) is located at central region 262 and a sixth Wheatstone bridge 274 (having sense elements 187 of $R_{21}$, $R_{22}$, $R_{23}$, $R_{24}$) is located proximate third outer edge 46 of diaphragm 34. And, a seventh Wheatstone bridge 276 (having sense elements 187 of $R_{25}$, $R_{26}$, $R_{27}$, $R_{28}$) is located at central region 262 and an eighth Wheatstone bridge 278 (having sense elements 187 of $R_{29}$, $R_{30}$, $R_{31}$, $R_{32}$) is located proximate fourth outer edge 48 of diaphragm 34.

With particular reference to FIG. 9, each of Wheatstone bridges 264, 266, 268, 270, 272, 274, 276, 278 is driven by a current source 280 interconnected between positive input nodes 282 and negative input nodes 284 of each of Wheatstone bridges 264, 266, 268, 270, 272, 274, 276, 278. Additionally, only one of Wheatstone bridges (i.e., Wheatstone bridge 264) is electrically connected to a system ground 286, while the remaining Wheatstone bridges 266, 268, 270, 272, 274, 276, 278 are not.

Each of Wheatstone bridges 264, 266, 268, 270, 272, 274, 276, 278 of pressure sensing element 260 includes a positive output node 288 and a negative output node 290. Like the previously described configurations, Wheatstone bridges 264, 266, 268, 270, 272, 274, 276, 278 are suitably connected to form a chained arrangement 292 of Wheatstone bridges 264, 266, 268, 270, 272, 274, 276, 278. As such, positive output node 288 of first Wheatstone bridge 264 is electrically connected to a positive terminal 294 of a differential amplifier 296. Negative output node 290 of the preceding Wheatstone bridge 264 is electrically connected to positive output node 288 of the successive, i.e., next, Wheatstone bridge 266 in chained arrangement 292. Negative output node 290 of the preceding Wheatstone bridge 266 is electrically connected to positive output node 288 of the next Wheatstone bridge 268 in chained arrangement 292, and so forth. Thus, negative output node 290 of the last Wheatstone bridge 278 of chained arrangement 292 is electrically coupled to a negative terminal 298 of differential amplifier 296. Accordingly, the differential outputs of Wheatstone bridges 264, 266, 268, 270, 272, 274, 276, 278 are combined by directly chaining the Wheatstone bridges to produce a composite output signal 300 that is approximately eight times that of a single one of Wheatstone bridges 264, 266, 268, 270, 272, 274, 276, 278 and with enhanced signal to noise performance.

Each of pressure sensing elements 42 (FIG. 2), 218 (FIG. 6), and 260 (FIG. 8) are directed toward a localized Wheatstone bridge configuration of sense elements 187. That is, the four legs of each Wheatstone bridge are placed in close proximity to one another within a single high stress area of diaphragm 34. Thus, interconnections between the sense elements 187 may be made with highly conductive implanted layers directly on the diaphragm. The interconnects between the multiple Wheatstone bridges can be done off-diaphragm, i.e., around the perimeter of diaphragm 34, in routing metallization. The localized Wheatstone bridge configurations discussed herein represent only a few embodiments. Other embodiments may include multiple Wheatstone bridges along each outer edge coupled with one or more Wheatstone bridges located near the center of the diaphragm. Symmetrical implementations have been shown in the example embodiments. However, asymmetric implementations (e.g., different number of Wheatstone bridges) within the high stress regions of the diaphragm may be envisioned.

Figure 10:
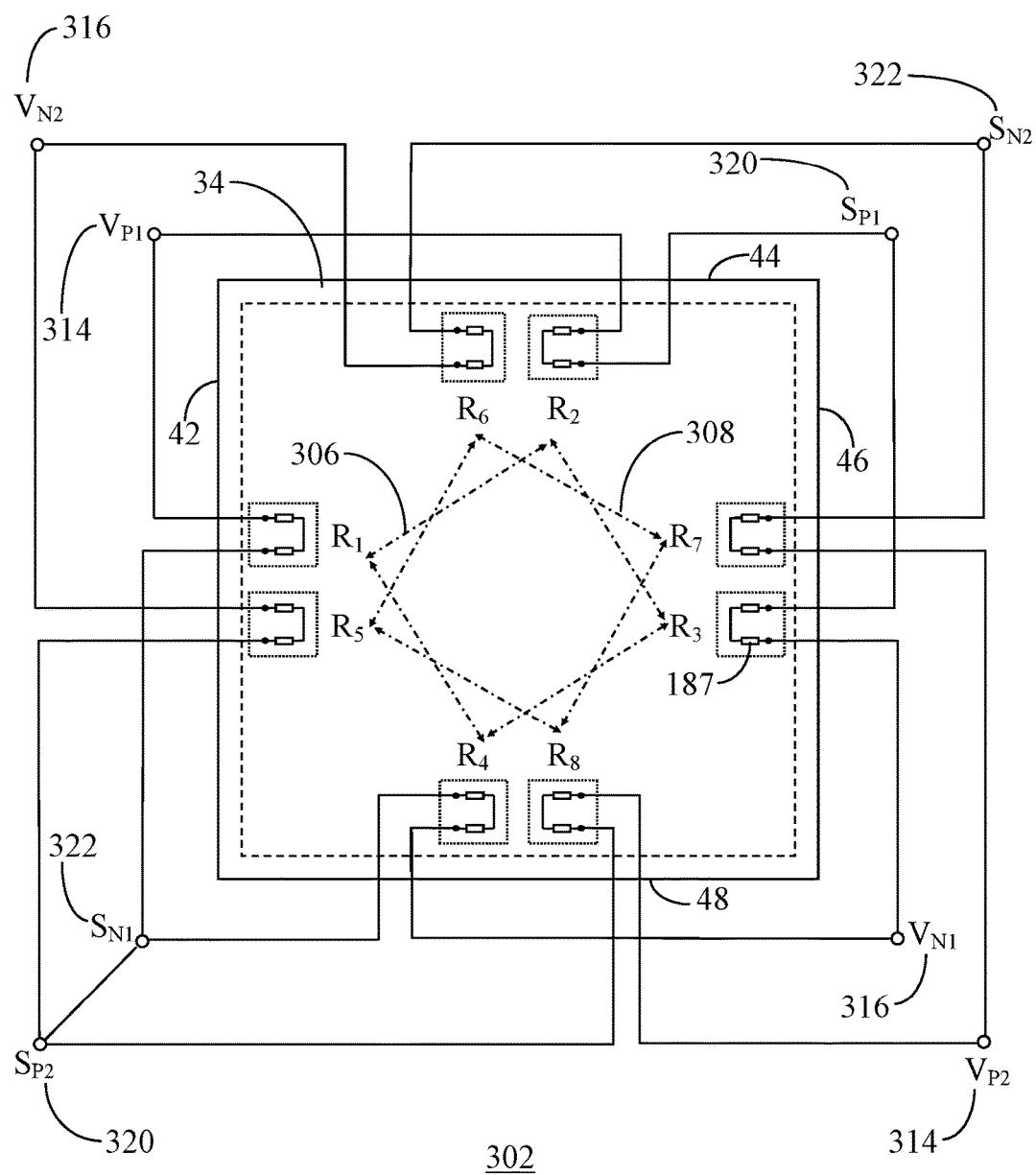
FIG. 10 shows a top view of a pressure sensing element for a pressure sensor in accordance with another embodiment.
Figure 11:
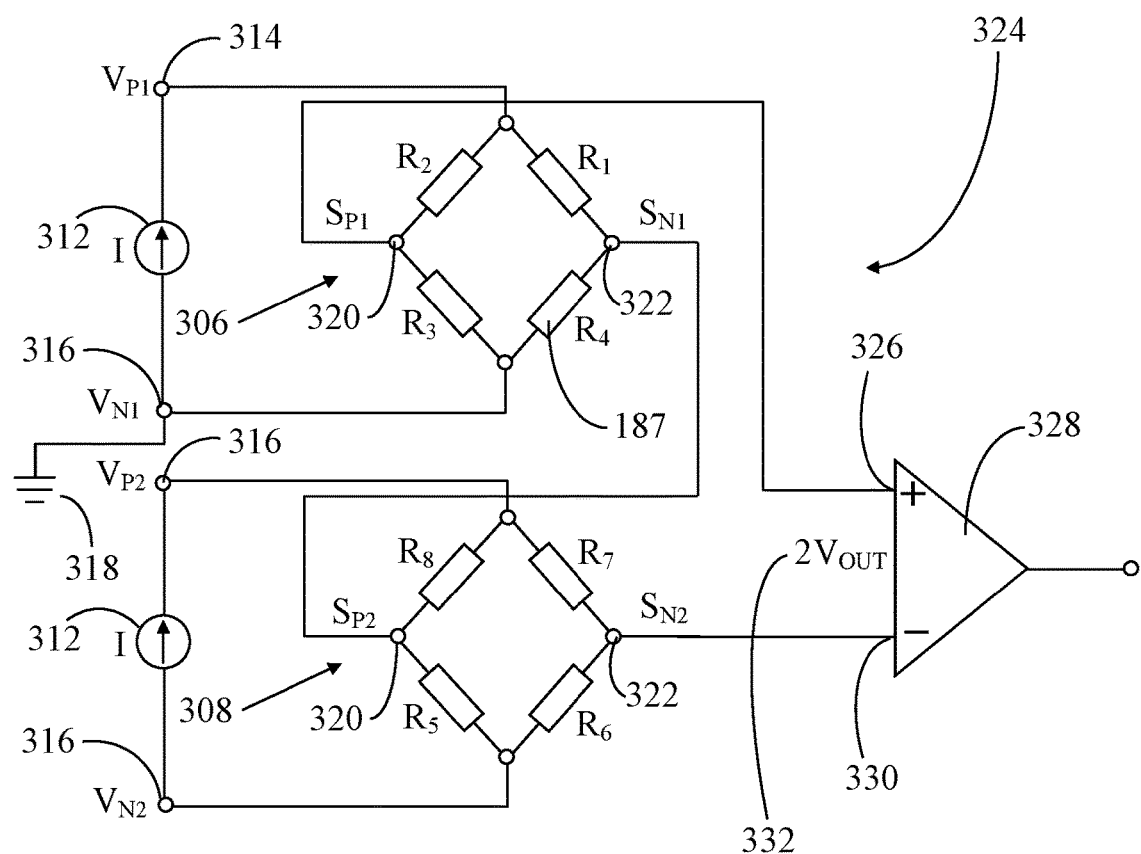
FIG. 11 shows a circuit diagram corresponding to the multiple Wheatstone bridge configuration of the pressure sensing element of FIG. 10.

Referring now to FIGS. 10 and 11, FIG. 10 shows a top view of a pressure sensing element 302 for a pressure sensor (e.g., pressure sensor 20 of FIG. 1) in accordance with another embodiment, and FIG. 11 shows a circuit diagram 304 corresponding to the multiple Wheatstone bridge configuration of pressure sensing element of 302. Again, the previous Wheatstone bridge configurations were directed toward a localized Wheatstone bridge approach. The following discussion will pertain to a distributed Wheatstone bridge approach. A distributed approach is one in which a sense element of a Wheatstone bridge is placed within each of four corresponding high stress regions of the diaphragm with appropriate orientation to generate the differential signal. Embodiments described herein includes multiple distributed Wheatstone bridges having their composite sense elements (i.e., piezoresistors) located within differing high stress regions of a pressure sensor diaphragm, with their bridge outputs being chained together.

Pressure sensing element 302 includes a first Wheatstone bridge 306 (having pairs of sense elements 187 of $R_1$, $R_2$, $R_3$, $R_4$ provided in diaphragm 34) and a second Wheatstone bridge 308 (having sense elements 187 of $R_5$, $R_6$, $R_7$, $R_8$ provided in diaphragm 34). One each of sense elements 187 forming first Wheatstone bridge 306 is located proximate one of each of first, second, third, and fourth outer edges 42, 44, 46, 48 of diaphragm 34. Thus, $R_1$ is located proximate first outer edge 42, $R_2$ is located proximate second outer edge 44, $R_3$ is located proximate third outer edge 46, and $R_4$ is located proximate fourth outer edge 48. Likewise, one each of sense elements 187 forming second Wheatstone bridge 308 is located proximate one of each of first, second, third, and fourth outer edges 42, 44, 46, 48 of diaphragm 34. Thus, $R_5$ is located proximate first outer edge 42 and adjacent to $R_1$. $R_6$ is located proximate second outer edge 44 and adjacent to $R_2$. $R_7$ is located proximate third outer edge 46 and adjacent to $R_3$. And, $R_8$ is located proximate fourth outer edge 48 and adjacent to $R_4$. Thus, a sense element 187 from each of the two Wheatstone bridges 306, 308 is placed within each of the four equivalent high stress regions around the perimeter of diaphragm.

With particular reference to FIG. 11, each of Wheatstone bridges 306, 308 is driven by a current source 312 interconnected between positive input nodes 314 and negative input nodes 316 of each of Wheatstone bridges 306, 308. Additionally, only one of Wheatstone bridges (i.e., Wheatstone bridge 306) is electrically connected to a system ground 318, while the other Wheatstone bridge 308 is not.

Each of Wheatstone bridges 306, 308 of pressure sensing element 302 includes a positive output node 320 and a negative output node 322. Like the previously described configurations, Wheatstone bridges 306, 308 are connected to form a chained arrangement 324 of Wheatstone bridges 306, 308. As such, positive output node 320 of a "first" Wheatstone bridge 306 is electrically connected to a positive terminal 326 of a differential amplifier 328. Negative output node 322 of the preceding Wheatstone bridge 306 is electrically connected to positive output node 320 of the successive, i.e., next, Wheatstone bridge 308 in chained arrangement 324. Since pressure sensing element 302 only has two Wheatstone bridges 306, 308, negative output node 322 Wheatstone bridge 308 is electrically connected to a negative terminal 330 of differential amplifier 328. Accordingly, the differential outputs of the distributed configuration of Wheatstone bridges 306, 308 are combined by directly chaining the Wheatstone bridges to produce a composite output signal 332 that is approximately twice that of a single one of Wheatstone bridges 306, 308.

The interconnection of sense elements 187 in a distributed Wheatstone bridge configuration may be complex. Because of the need for so many cross-overs to connect sense elements 187, a distributed approach may be most suitably implemented in an integrated process in which the interconnections and routing can all be done off of diaphragm 34 (as indicated in FIG. 10) and accomplished within multiple levels of backend metallization. To allow the chaining together of the bridge outputs with a simple interconnection at one corner, Wheatstone bridges 306, 308 may be driven from the complementary opposing corners.

Figure 12:
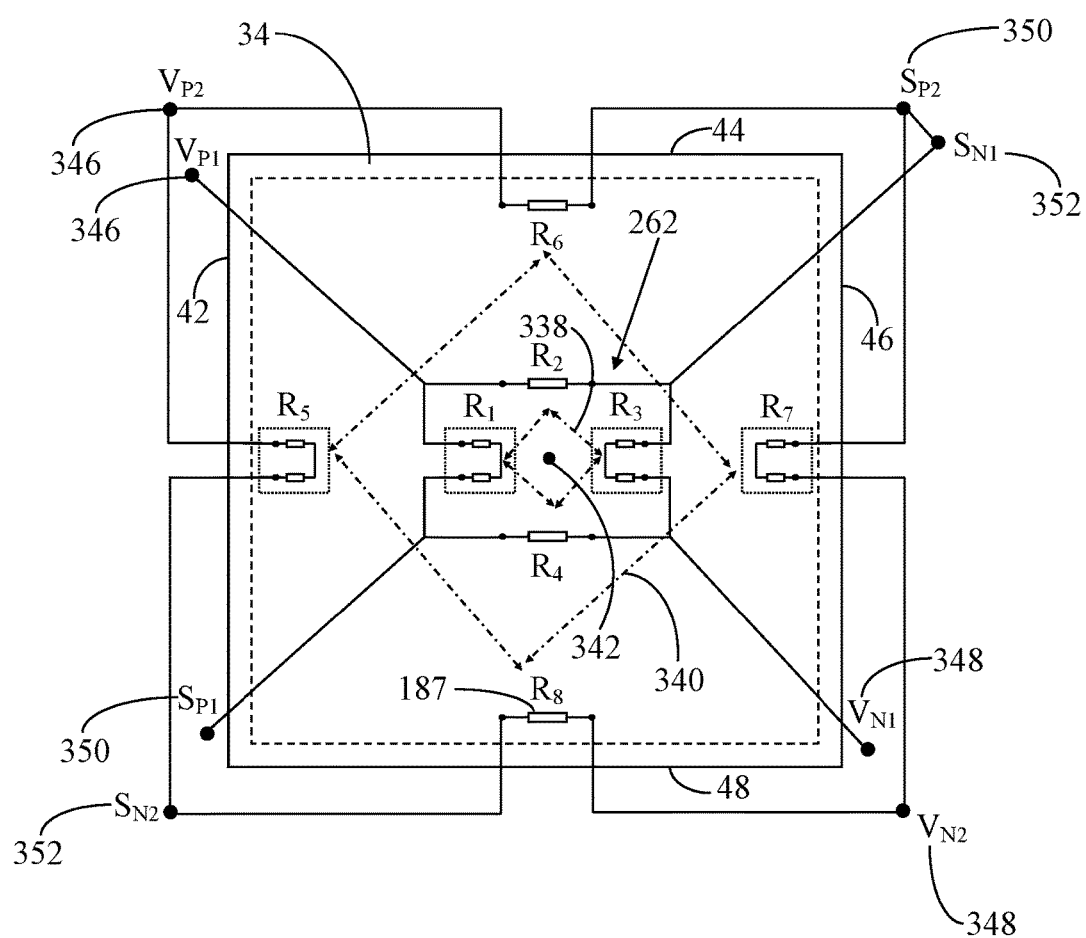
FIG. 12 shows a top view of a pressure sensing element for a pressure sensor in accordance with another embodiment.
Figure 13:
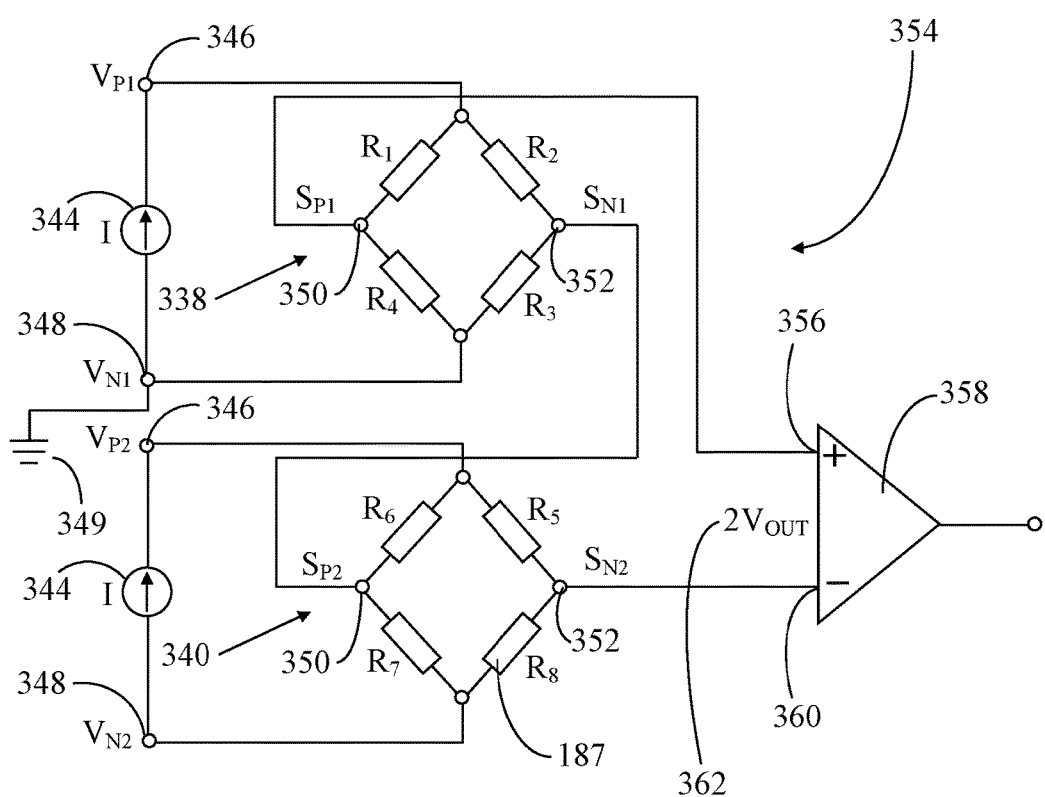
FIG. 13 shows a circuit diagram corresponding to the multiple Wheatstone bridge configuration of the pressure sensing element of FIG. 12.

Referring now to FIGS. 12 and 13, FIG. 12 shows a top view of a pressure sensing element 334 for a pressure sensor (e.g., pressure sensor 20 of FIG. 1) in accordance with another embodiment, and FIG. 13 shows a circuit diagram 336 corresponding to the multiple Wheatstone bridge configuration of pressure sensing element 334. FIGS. 12 and 13 demonstrate another distributed Wheatstone bridge configuration which utilizes the high stress regions around the perimeter of diaphragm 34 as well as in central region 262 of diaphragm 34. Such a configuration may be a less interconnect-intensive implementation than that shown in FIGS. 10 and 11 since the connections between the sense elements in the central region 262 may be done with an implanted highly conductive layer in the silicon semiconductor. The bridge outputs may be chained together off-diaphragm. Further, since the stress in the central region 262 is in the opposite direction to the stress at the outer edges 42, 44, 46, 48, both Wheatstone bridges may be current driven from the same corner of the layout.

Pressure sensing element 334 includes a first Wheatstone bridge 338 (having sense elements 187 of $R_1$, $R_2$, $R_3$, $R_4$ provided in diaphragm 34) and a second Wheatstone bridge 340 (having sense elements 187 of $R_5$, $R_6$, $R_7$, $R_8$ provided in diaphragm 34). In this example, sense elements 187 for $R_1$, $R_3$, $R_5$, $R_7$ are made up of pairs of sense elements 187. Whereas, sense elements 187 for $R_2$, $R_4$, $R_6$, $R_8$ are made up of single sense elements 187 that are illustrated as being longer than sense elements 187 for $R_1$, $R_3$, $R_5$, $R_7$. It should be understood that the nominal resistance for each of the pairs of sense elements 187 that make up $R_1$, $R_3$, $R_5$, $R_7$ is equivalent to the nominal resistance for each of the individual sense elements 187 that make up $R_2$, $R_4$, $R_6$, $R_8$.

Sense elements 187 of first Wheatstone bridge 338 are distributed within central region 262. Thus, one each of sense elements 187 forming first Wheatstone bridge 338 is located in central region 262 but is displaced away from a midpoint 342 of diaphragm 34. However, sense elements 187 of second Wheatstone bridge 340 are distributed in proximity to the perimeter of diaphragm 34. Thus, $R_5$ is located proximate first outer edge 42, $R_6$ is located proximate second outer edge 44, $R_7$ is located proximate third outer edge 46, and $R_8$ is located proximate fourth outer edge 48.

With particular reference to FIG. 13, each of Wheatstone bridges 338, 340 is driven by a current source 344 interconnected between positive input nodes 346 and negative input nodes 348 of each of Wheatstone bridges 338, 340. Additionally, only one of Wheatstone bridges (i.e., Wheatstone bridge 338) is electrically connected to a system ground 349, while the other Wheatstone bridge 340 is not.

Each of Wheatstone bridges 338, 340 of pressure sensing element 334 includes a positive output node 350 and a negative output node 352. Like the previously described configurations, Wheatstone bridges 338, 340 are connected to form a chained arrangement 354 of Wheatstone bridges 338, 340. As such, positive output node 350 of a "first" Wheatstone bridge 338 is electrically connected to a positive terminal 356 of a differential amplifier 358. Negative output node 352 of the preceding Wheatstone bridge 338 is electrically connected to positive output node 350 of the successive, i.e., next, Wheatstone bridge 340 in chained arrangement 354. Since pressure sensing element 334 has two Wheatstone bridges 338, 340, negative output node 352 Wheatstone bridge 340 is electrically connected to a negative terminal 360 of differential amplifier 358. Accordingly, the differential outputs of the distributed configuration of Wheatstone bridges 338, 340 are combined by directly chaining the Wheatstone bridges to produce a composite output signal 362 that is approximately twice that of a single one of Wheatstone bridges 338, 340.

FIGS. 10-13 represent a couple of basic embodiments utilizing multiple distributed Wheatstone bridges for enhanced sensitivity. Other embodiments could include a mixture of sense elements in the edge and central regions and/or a different quantity of Wheatstone bridges. Further, some embodiments may implement a combination of localized and distributed Wheatstone bridge configurations.

Thus, embodiments disclosed herein entail a pressure sensor with enhanced sensitivity, and improved signal-to-noise ratio performance. An embodiment of a pressure sensor comprises a substrate having a cavity, a diaphragm suspended across the cavity, a first group of sense elements provided in the diaphragm, the sense elements of the first group being coupled to one another to form a first Wheatstone bridge, the first Wheatstone bridge having a first positive output node and a first negative output node, and a second group of sense elements provided in the diaphragm, the sense elements of the second group being coupled to one another to form a second Wheatstone bridge, the second Wheatstone bridge having a second positive output node and a second negative output node. The first negative output node of the first Wheatstone bridge is electrically connected to the second positive output node of the second Wheatstone bridge, and the first and second Wheatstone bridges produce a composite output signal as a function of an external pressure stimulus detected by each of the first and second Wheatstone bridges.

Another embodiment of a pressure sensor comprises a substrate having a cavity, a diaphragm suspended across the cavity, the diaphragm including regions that are under high stress relative to other regions of the diaphragm; and a plurality of groups of sense elements provided in the diaphragm within the regions that are under high stress. The groups of sense elements form a plurality of Wheatstone bridges, each of the plurality of Wheatstone bridges having a positive output node and a negative output node. For the plurality of Wheatstone bridges, the negative output node of an immediately preceding one of the Wheatstone bridges is electrically connected to the positive output node of an immediately successive one of the Wheatstone bridges to form a chained arrangement of the plurality of Wheatstone bridges, the chained arrangement of the Wheatstone bridges producing a composite output signal as a function of an external pressure stimulus detected by each of the plurality of Wheatstone bridges.

Yet another embodiment of a pressure sensor comprises a substrate having a cavity, a diaphragm suspended across the cavity, a first group of sense elements provided in the diaphragm, the sense elements of the first group being coupled to one another to form a first Wheatstone bridge, the first Wheatstone bridge having a first positive input node, a first negative input node, a first positive output node, and a first negative output node. A second group of sense elements is provided in the diaphragm, the sense elements of the second group being coupled to one another to form a second Wheatstone bridge, the second Wheatstone bridge having a second positive input node, a second negative input node, a second positive output node, and a second negative output node. The first negative output node of the first Wheatstone bridge is electrically connected to the second positive output node of the second Wheatstone bridge, and the first and second Wheatstone bridges produce a composite output signal as a function of an external pressure stimulus detected by each of the first and second Wheatstone bridges. The pressure sensor further comprises a current source interconnected between the first positive input node and the first negative input node of the first Wheatstone bridge, and the current source further being interconnected between the second positive input node and the second negative input node of the second Wheatstone bridge, the current source being configured to deliver a supply current to each of the first and second Wheatstone bridges, and a differential amplifier having a positive terminal, a negative terminal, and an output terminal wherein the first positive output node of the first Wheatstone bridge is electrically connected to the positive terminal, the second negative output node of the second Wheatstone bridge is in electrical communication with the negative terminal, and the output terminal provides the composite output signal.

Accordingly, a pressure sensor includes a multiple Wheatstone bridge configuration of piezoresistors located within differing high stress spots of a pressure sensor diaphragm. The Wheatstone bridges are driven with current sources to allow the bridge potentials to float. Further, the differential voltage outputs of the Wheatstone bridges are combined by directly chaining the outputs together to yield a single composite output having enhanced sensitivity and improved SNR performance. As such, various inventive concepts and principles embodied in the pressure sensor may improve product quality while enabling cost savings.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A pressure sensor comprising:
a substrate having a cavity;
a diaphragm suspended across said cavity;
a first group of sense elements provided in said diaphragm, said sense elements of said first group being coupled to one another to form a first Wheatstone bridge, said first Wheatstone bridge having a first positive output node and a first negative output node; and
a second group of sense elements provided in said diaphragm, said sense elements of said second group being coupled to one another to form a second Wheatstone bridge, said second Wheatstone bridge having a second positive output node and a second negative output node, wherein said first negative output node of said first Wheatstone bridge is electrically connected to said second positive output node of said second Wheatstone bridge, said first positive output node of said first Wheatstone bridge is electrically disconnected from said second negative output node of said second Wheatstone bridge, and said first and second Wheatstone bridges produce a composite output signal as a function of an external pressure stimulus detected by said each of said first and second Wheatstone bridges.

2. The pressure sensor of claim 1 wherein:
said first Wheatstone bridge has a first positive input node and a first negative input node;
said second Wheatstone bridge has a second positive input node and a second negative input node; and
said pressure sensor further comprises a current source interconnected between said first positive input node and said first negative input node of said first Wheatstone bridge, said current source further being interconnected between said second positive input node and said second negative input node of said second Wheatstone bridge, and said current source being configured to deliver a supply current to said each of said first and second Wheatstone bridges.

3. The pressure sensor of claim 2 wherein one of said first and second negative input nodes is electrically coupled to a system ground and the other of said first and second negative input nodes is not electrically coupled to said system ground.

4. The pressure sensor of claim 1 further comprising a differential amplifier having a positive terminal, a negative terminal, and an output terminal wherein said first positive output node of said first Wheatstone bridge is electrically connected to said positive terminal, said second negative output node of said second Wheatstone bridge is in electrical communication with said negative terminal, and said output terminal provides said composite output signal.

5. The pressure sensor of claim 1 further comprising additional groups of sense elements provided in said diaphragm to form additional Wheatstone bridges, each of said additional Wheatstone bridges having a positive output node and a negative output node, wherein said second negative output node of said second Wheatstone bridge is electrically connected to said positive output node of a first one of said additional Wheatstone bridges, and said negative output node of each of said additional Wheatstone bridges is electrically connected to said positive output node of a successive one of said additional Wheatstone bridges to form a chained arrangement of said first, second, and additional Wheatstone bridges to produce said composite output signal.

6. The pressure sensor of claim 5 further comprising a current source interconnected between a positive input node and a negative input node of each of said first Wheatstone bridge, said second Wheatstone bridge, and said each of said additional Wheatstone bridges, said current source being configured to deliver a supply current to each of said Wheatstone bridges.

7. The pressure sensor of claim 5 further comprising a differential amplifier having a positive terminal, a negative terminal, and an output terminal wherein said first positive output node of said first Wheatstone bridge is electrically connected to said positive terminal, said negative output node of a last one of said additional Wheatstone bridges in said chain is electrically connected to said negative terminal, and said output terminal provides said composite output signal.

8. The pressure sensor of claim 1 wherein said diaphragm includes regions that are under high stress relative to other regions of said diaphragm, and said sense elements of each of said first and second groups of sense elements are located within said regions that are under high stress.

9. The pressure sensor of claim 1 wherein said diaphragm has first and second outer edges, said first group of sense elements forming said first Wheatstone bridge is located proximate said first outer edge, and said second group of sense elements forming said second Wheatstone bridge is located proximate said second outer edge.

10. The pressure sensor of claim 1 wherein said diaphragm includes a central region circumscribed by outer edges, said first group of sense elements forming said first Wheatstone bridge is located proximate one of said first outer edges, and said second group of sense elements forming said second Wheatstone bridge is located at said central region.

11. The pressure sensor of claim 1 wherein said diaphragm has an outer edge, said first group of sense elements forming said first Wheatstone bridge is located proximate said outer edge, and said second group of sense elements forming said second Wheatstone bridge is located proximate said outer edge and adjacent to said first group of sense elements.

12. The pressure sensor of claim 1 wherein:
said diaphragm has first, second, third, and fourth outer edges, said first and second outer edges being disposed on opposing sides of a surface of said diaphragm, and said third and fourth outer edges being disposed on opposing sides of said surface of said diaphragm and interposed between said first and second outer edges so that said surface of said diaphragm is circumscribed by said first, second, third, and fourth outer edges;
one each of said sense elements of said first group of sense elements forming said first Wheatstone bridge is located proximate one each of said first, second, third, and fourth edges; and
one each of said sense elements of said second group of sense elements forming said second Wheatstone bridge is located proximate said one each of said first, second, third, and fourth edges.

13. The pressure sensor of claim 1 wherein:
said diaphragm includes a central region circumscribed by first, second, third, and fourth outer edges;

one each of said sense elements of said first group of sense elements forming said first Wheatstone bridge is located proximate one each of said first, second, third, and fourth edges; and said second group of sense elements forming said second Wheatstone bridge is located at said central region.

14. A pressure sensor comprising:
a substrate having a cavity;
a diaphragm suspended across said cavity, said diaphragm including regions that are under high stress relative to other regions of said diaphragm; and
a plurality of groups of sense elements provided in said diaphragm within said regions that are under high stress, said groups of sense elements forming a plurality of Wheatstone bridges, each of said plurality of Wheatstone bridges having a positive output node and a negative output node, wherein for said plurality of Wheatstone bridges, said negative output node of an immediately preceding one of said Wheatstone bridges is electrically connected to said positive output node of an immediately successive one of said Wheatstone bridges to form a chained arrangement of said plurality of Wheatstone bridges, said positive output node of said immediately preceding one of said Wheatstone bridges is electrically disconnected from said negative output node of the immediately successive one of said Wheatstone bridges, said chained arrangement of said Wheatstone bridges producing a composite output signal as a function of an external pressure stimulus detected by said each of said plurality of Wheatstone bridges.

15. The pressure sensor of claim 14 further comprising a current source interconnected between a positive input node and a negative input node of said each of said plurality of Wheatstone bridges, said current source being configured to deliver a supply current to each of said Wheatstone bridges.

16. The pressure sensor of claim 14 further comprising a differential amplifier having a positive terminal, a negative terminal, and an output terminal wherein said positive output node of a first one of said plurality of Wheatstone bridges in said chained arrangement is electrically connected to said positive terminal, said negative output node of a last one of said plurality of Wheatstone bridges in said chained arrangement is electrically connected to said negative terminal, and said output terminal provides said composite output signal.

17. A pressure sensor comprising:
a substrate having a cavity;
a diaphragm suspended across said cavity;
a first group of sense elements provided in said diaphragm, said sense elements of said first group being coupled to one another to form a first Wheatstone bridge, said first Wheatstone bridge having a first positive input node, a first negative input node, a first positive output node, and a first negative output node;
a second group of sense elements provided in said diaphragm, said sense elements of said second group being coupled to one another to form a second Wheatstone bridge, said second Wheatstone bridge having a second positive input node, a second negative input node, a second positive output node, and a second negative output node, wherein said first negative output node of said first Wheatstone bridge is electrically connected to said second positive output node of said second Wheatstone bridge, said first positive output node of said first Wheatstone bridge is electrically disconnected from said second negative output node of said second Wheatstone bridge, and said first and second Wheatstone bridges produce a composite output signal as a function of an external pressure stimulus detected by said each of said first and second Wheatstone bridges;

a current source interconnected between said first positive input node and said first negative input node of said first Wheatstone bridge, and said current source further being interconnected between said second positive input node and said second negative input node of said second Wheatstone bridge, said current source being configured to deliver a supply current to said each of said first and second Wheatstone bridges; and a differential amplifier having a positive terminal, a negative terminal, and an output terminal wherein said first positive output node of said first Wheatstone bridge is electrically connected to said positive terminal, said second negative output node of said second Wheatstone bridge is in electrical communication with said negative terminal, and said output terminal provides said composite output signal.

18. The pressure sensor of claim 17 wherein said diaphragm has first and second outer edges, said first group of sense elements forming said first Wheatstone bridge is located proximate said first outer edge, and said second group of sense elements forming said second Wheatstone bridge is located proximate said second outer edge.

19. The pressure sensor of claim 17 wherein said diaphragm includes a central region circumscribed by outer edges, said first group of sense elements forming said first Wheatstone bridge is located proximate at least one of said outer edges, and said second group of sense elements forming said second Wheatstone bridge is located at said central region.

20. The pressure sensor of claim 17 wherein:
said diaphragm has first, second, third, and fourth outer edges, said first and second outer edges being disposed on opposing sides of a surface of said diaphragm, and said third and fourth outer edges being disposed on opposing sides of said surface of said diaphragm and interposed between said first and second outer edges so that said surface of said diaphragm is circumscribed by said first, second, third, and fourth outer edges;
one each of said sense elements of said first group of sense elements forming said first Wheatstone bridge is located proximate one each of said first, second, third, and fourth edges; and
one each of said sense elements of said second group of sense elements forming said second Wheatstone bridge is located proximate said one each of said first, second, third, and fourth edges.

* * * * *